July 10, 1928.
A. DITTLINGER ET AL
1,676,255
LIQUID QUANTITY INDICATING DEVICE
Filed May 5, 1924        2 Sheets-Sheet 1
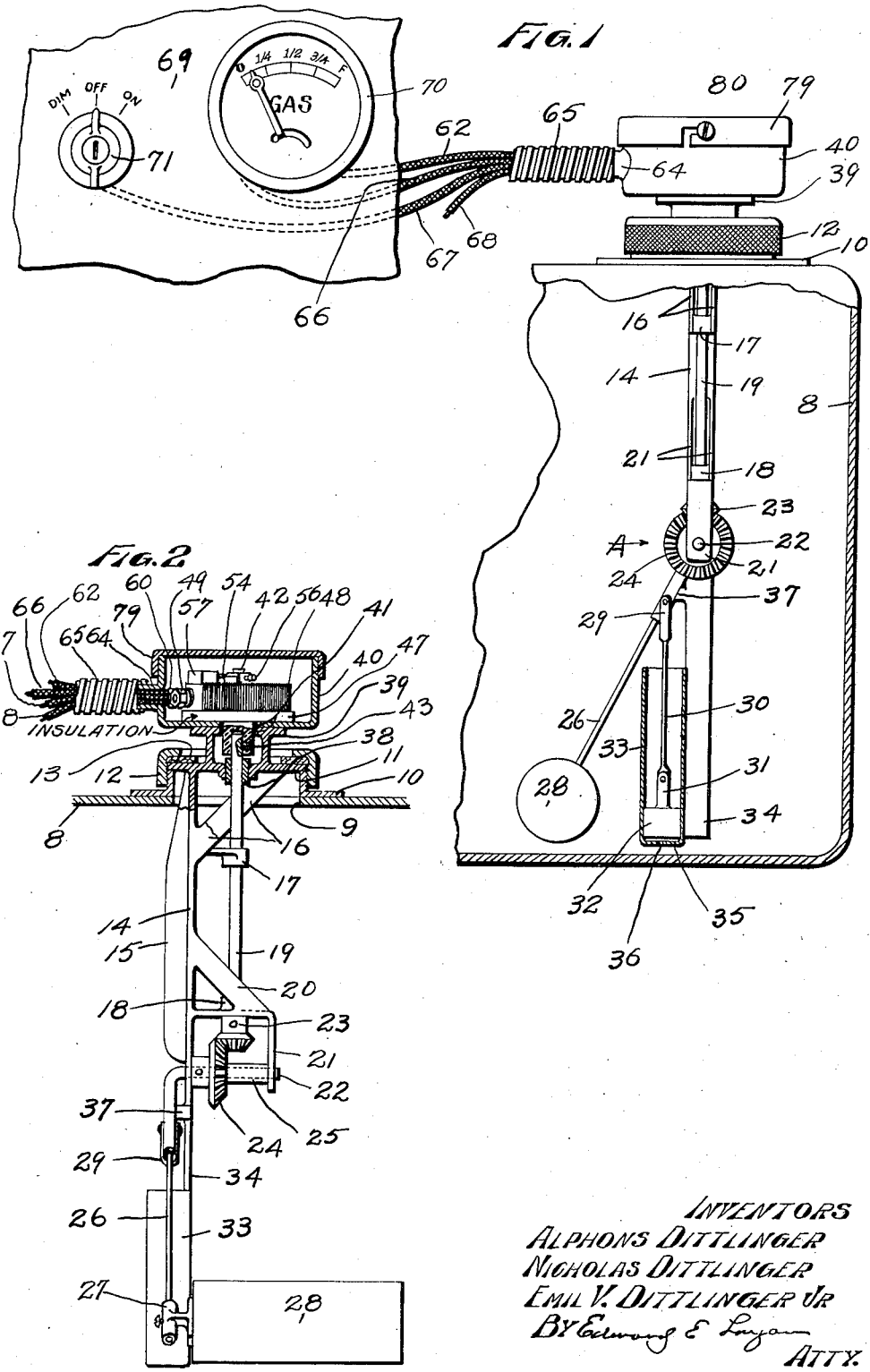

July 10, 1928.  1,676,255
A. DITTLINGER ET AL
LIQUID QUANTITY INDICATING DEVICE
Filed May 5, 1924  2 Sheets-Sheet 2
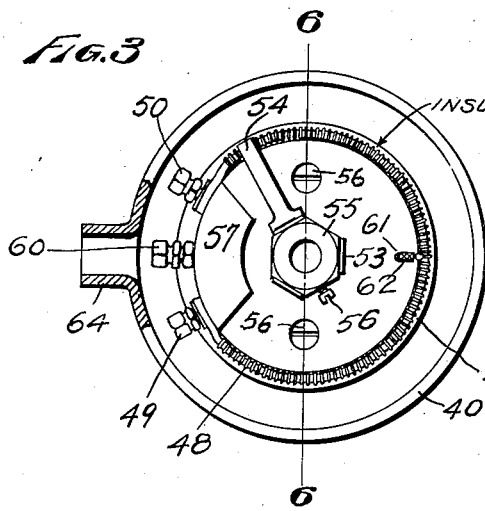
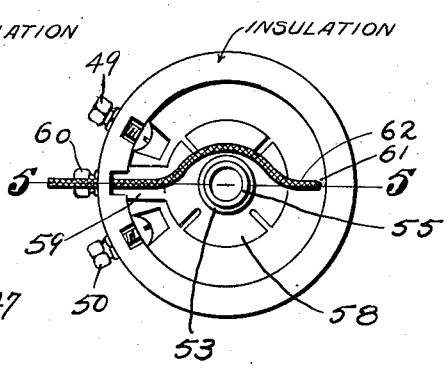
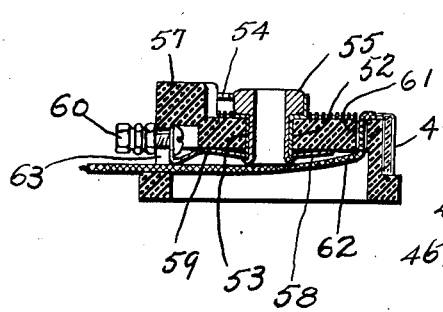
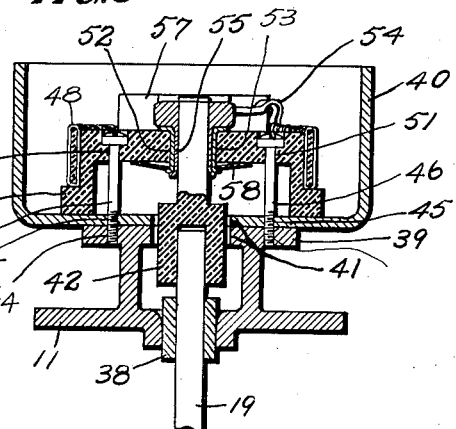
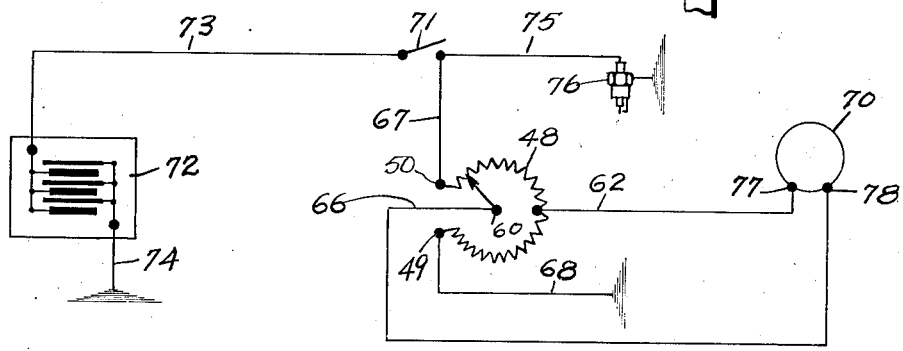
INVENTORS
ALPHONS DITTLINGER
NICHOLAS DITTLINGER
EMIL V. DITTLINGER JR
BY Edward E Logan
ATTY.

Patented July 10, 1928.

1,676,255

UNITED STATES PATENT OFFICE.

ALPHONS DITTLINGER, EMIL V. DITTLINGER, JR., AND NICHOLAS DITTLINGER, OF ST. LOUIS, MISSOURI.

LIQUID-QUANTITY-INDICATING DEVICE.

Application filed May 5, 1924. Serial No. 711,161.

Our device relates to improvements in liquid quantity indicating devices and has for its primary object a device electrically operated which will indicate the quantity of liquid in a container.

A further object is to construct an electrically operated liquid quantity indicating device in which absolutely no electrical connections are made within the tank or container in which the liquid is stored thus making the device applicable to containers in which volatile and explosive liquid, such as gasoline and the like, are stored without any danger of explosions.

A still further object is to construct a liquid quantity indicating device which is provided with a check so that when the device is used in moving vehicles, such as automobiles, the agitation of the liquid in the container will not cause a fluctuation in the indicator so that the indicator will at all times give a steady and correct indication of the amount of liquid within the container.

In the drawings:

Fig. 1 is a side elevation of our device showing the same installed with the liquid container broken away and in section and showing the manner of making the electrical connections;

Fig. 2 is an end view of Fig. 1 viewed in the direction of the arrow A with portions broken away and in section;

Fig. 3 is a top plan view of the resistance mechanism with the housing in horizontal section;

Fig. 4 is a bottom plan view of the resistance mechanism;

Fig. 5 is a vertical section taken on the line 5—5 of Fig. 4;

Fig. 6 is a vertical section taken on the line 6—6 of Fig. 3; and

Fig. 7 is a diagrammatic view illustrating the manner of making the various connections.

In carrying out our invention we employ a liquid container 8, the top of which is provided with an opening 9. The opening 9 is surrounded by an upwardly extending screw threaded flange 10, on which rests a supporting plate 11. The supporting plate is secured to the flange by means of a collar 12 and is made leak proof by the gasket 13. Carried by the underside of the plate 11 is a support or bracket 14 which is provided with a stiffening rib 15 and braces 16. Carried by the bracket 14 are bearings 17 and 18 through which a shaft 19 extends. The bearing 18 is stiffened by means of braces 20 and is provided with a downwardly projecting portion 21 which is parallel to and spaced away from the bracket 14. In this downwardly extending portion 21 and in the bracket 14 is pivotally mounted an L-shaped shaft 22. Secured to the lower end of the shaft 19 is a bevel gear 23 which meshes with a bevel gear 24 carried by the shaft 22, the bevel gear 24 being located between the bracket 14 and extension 21. The gears 23 and 24 are secured to their respective shafts in any well known manner. The shaft 22 is further provided with a sleeve 25 which prevents the gear 24 from moving toward the depending portion 21, while the hub of the gear 24 prevents any movement toward the bracket 14.

Secured to the shaft 22 is a rod 26, which rod is secured in a bracket 27 carried by the float 28, the purpose of this float will be explained in detail later. Pivotally secured to the shaft 22 is the bifurcated end 29 of a rod 30, the opposite end of which rod is secured pivotally to the extension 31 carried by the plunger 32. The plunger or piston 32 is mounted in a cylinder 33 which is carried by the portion 34 of the bracket 14 in such a manner that the lower end of the cylinder is slightly raised above the bottom of the container 8. The lower end of the cylinder 33 is closed as indicated at 35, and is provided with a perforation 36, while the upper end of the cylinder 33 is open. The extension 34 is also provided with a stop 37 which limits the downward movement of the float 28.

Mounted in the plate 11 is a sleeve 38 which acts as a bearing for the upper portion of the shaft 19. The plate 11 also carries a supporting base 39 on which a housing 40 is secured. The housing 40 as well as the supporting base 39, are provided with openings 41 through which a shaft 42 formed of insulating material is passed. The shaft 42 being provided on its lower end with an enlargement through which a fastening means 43 passes and by means of which it is secured to the shaft 19. The supporting base 39 is also provided with screw threaded openings 44, while the housing 40 is provided 110 with openings 45, which openings are in alinement with the openings 43 so as to permit the screws 46 to pass therethrough. These screws 46 not only secure the housing 40 to the supporting block 39, but also secure the resistance member within the housing. The resistance member consists of a cup-shaped member 47, which is formed of insulating material, the upper portion of this member being reduced in diameter as illustrated in Figs. 5 and 6. The reduced portion is surrounded by a coil 48, the ends of which terminate in binding screws 49 and 50.

It will be noted from Figs. 5 and 6 that the cup-shaped insulator or member 47 is located within the housing in inverted position, and the closed portion of the cup-shaped member is provided with openings 51 through which the screws 46 pass so that when these screws are driven home, the entire resistance unit together with the housing will be fixed to the supporting plate 39. The cup-shaped member is also provided with a central opening 52 through which extends a sleeve 53, this sleeve carrying a contact finger 54 which is adapted to contact with the resistance coil 48. Extending through the sleeve 53 is a second sleeve 55 which carries a securing means 56. This securing means is adapted to tighten the sleeve 55 to the insulating shaft 42. The upper portion of the securing sleeve 55 is preferably polygonal so that the sleeve 53 can have portions bent upward to engage with some of the sides of the polygonal portion of the sleeve 55 and cause both sleeves to turn simultaneously. This is clearly illustrated in Fig. 3.

The upper surface of the cup-shaped member 47 is provided with a projection 57, this projection limits the movement of the contact arm 54 and is so positioned as to prevent the finger 54 from contacting with the binding posts 49 and 50. Located within the hollow portion of the cup-shaped member and held against the under face thereof by means of upsetting the sleeves 53 and 55, is a spring washer 58 which is provided with an extension 59, this extension in turn being secured to the binding post 60. The closed portion of the cup-shaped member 47 is also provided with an opening 61, this opening is diametrically opposite the binding post 49 and has extending therethrough an electric conductor 62, which conductor is attached to the resistance coil 48 at a point equi-distant between the binding posts 49 and 50. In other words the conductor 62 is so attached that there will be an equal number of coils between it and either of the binding posts.

The conductor 62 is bent around the insulating shaft 42, as illustrated in Fig. 4, and passes through the opening 63 formed in the side wall of the cup-shaped member 47.

The housing 40 is provided with an outwardly projecting sleeve 64 around which is adapted to be secured a conduit 65. This sleeve is so arranged as to be adjacent the binding screws 49, 50 and 60 and with the conduit permit the passage of the electrical conductors 62, 66, 67 and 68 from the housing 40 to their respective terminals.

69 represents the instrument board of an automobile, 70 an electrically operated quantity indicating gauge and 71 the ignition switch. The indicating gauge is preferably what is known commercially as a milliammeter, that is, a device when no current is being passed through it the hand will stand absolutely vertical, and when the current is passed in one direction the hand will move to the left of the center, and when passed in the opposite direction move to the right of the center.

The resistance mechanism which we employ is commercially known as a potentiometer as we have found this to be more sensitive and consequently better adapted for our purpose than the ordinary commercial rheostat.

In referring to Fig. 7 the battery is indicated by the numeral 72 and has one of its conductors 73 connected to the ignition switch 71. The conductor 74 of the battery is grounded in any well known manner. The conductor 67 is connected to the ignition wire 75 which is only placed in circuit when the ignition switch 71 is closed. The spark plug 76 being grounded through the engine, while the conductor 68 which is attached to the binding post 49 is also grounded. The conductor 62 leads to the binding post 77 carried by the indicator 70, while the conductor 66 which is attached to the binding post 60, leads to the binding post 78 likewise carried by the indicator 70.

The operation of our device is as follows—

After the indicator has been properly placed in the instrument board and the device placed in position within the fuel tank of a motor vehicle, the electric conductor 68 is grounded in any suitable manner, and after all electrical connections within the housing 40 have been tightened, the cover 79 is placed over the top of the housing and held in position by means of screws or other fastening means 80. The fuel tank is now ready to receive the fuel; as the fuel enters the tank 8 the float 28 commences to rise and in so doing rotates the gear 21 which in turn, through the rotation of the gear 23 and shaft 19, places the contact arm or finger 54 in rotation causing it to travel from the binding post 50 toward the conductor 62 until such time when the contact arm or finger 54 comes directly over the conductor 62, during which time no current will be passing through the device and the hand stands vertical. Before the contact arm 54, however, reaches the conductor 62, the depth or quantity of the liquid within the container may be ascertained by closing the ignition switch which will at once energize the resistance coil 48 and if the tank is less than half full, will draw the hand toward the left. As soon as the tank shows more than half full the contact arm will have passed the conductor 62 and as it gradually approaches the binding post 49 the hand will travel over toward the right hand side of the indicator. Should the ignition switch however, be turned off, the hand of the indicator will stand vertical. But as soon as the switch is closed, it will move either to the right or left of the vertical according to the position of the contact finger 54 on the rheostat.

During the operation of filling, the float 28 rises and in so doing also pulls up the plunger or piston 32, this piston being a fairly snug fit within the cylinder 33 causes a suction to be set up, which draws the liquid from the container through the opening 36 formed in the closed end 35. This opening however, is of relatively small diameter so as to allow liquid to pass therethrough but slowly. In other words the float 28 can be elevated slowly, but should any sudden tendency to elevate this float occur, such as by violent agitation of the contents of the container, the piston 32 will also have to rise suddenly. This sudden rising however, is prevented by permitting liquid to enter beneath the piston slowly so that a violent upward movement of the piston would have a tendency to create a partial vacuum in the cylinder 33, this partial vacuum checking the upward movement of the float. While any sudden downward movement is prevented by reason of the smallness of the opening 36 which will permit the liquid to be forced therethrough only gradually. In this way sudden jumps of the indicator due to agitation of the liquid in the container which constantly occurs in an automobile being driven over a roadway, is prevented and the gauge gives substantially a steady reading.

It is to be futhermore noted that our device does not operate, or in other words indicate, unless the ignition switch is turned on.

A very essential feature of our device is the location of the rheostat and consequently of the electrical connections, all of which are without the container and thoroughly insulated therefrom so that there is absolutely no danger of a spark occurring within the container and igniting any vapors which may be therein.

Furthermore in a device as constructed by us an accurate reading can be had at all times as there will be no losses of pressure carrying medium due to absorption or temperature changes.

Furthermore the amount of current consumed by our device is negligible and really the only time that any consumption takes place is during the time that the automobile is being driven and consequently the battery being recharged by the generator.

Another feature is that the device does not require a skilled mechanic to install the same because there are no pipe connections whatever to make, but merely a few electrical connections which can be readily made by a novice.

Having fully described our invention what we claim is:—

1. A quantity indicating device for liquid containers comprising a plate carried by said container, a support carried by said plate and extending into said container, a float pivotally carried by said support, a shaft rotatably mounted in said support and extending through said plate, said shaft adapted to be rotated by the rise and fall of said float, a housing mounted on said plate above the container, a shaft of insulating material carried by said first mentioned shaft and extending into said housing, a potentiometer mounted in said housing, a contact finger carried by said insulating shaft and contacting with said potentiometer, a cylinder located in said liquid container and open at its top having a perforate closure at its lower end carried by said support and adapted to have liquid ingress and egress therethrough, a piston located in said cylinder, and a rod pivotally connected to said piston and float whereby the rapidity of rise and fall of the float is controlled by the rate of passage of liquid to and from the container through the perforate bottom of the cylinder.

2. A quantity indicating device for liquid containers comprising a plate carried by said container, a support carried by said plate and extending into said container, an arm pivotally carried by said support, a float secured to said arm, a shaft rotatably mounted in said support and extending through said plate, means carried by said arm and shaft whereby said shaft is rotated when the arm is raised and lowered by said float, a cylinder located in said liquid container and carried by said support, said cylinder being open at its upper end and having its lower end closed, said closed end having a restricted passage therethrough, the lower end at least of said cylinder adapted to be submerged in the liquid in the container so that the same can enter the cylinder through the passage, a piston located in said cylinder, a rod pivotally connected to said piston and arm whereby said piston will be moved up and down simultaneously with the rise and fall of said arm, the rate of movement of said piston being controlled by the rapidity at which liquid can pass through the restricted opening in the bottom of the cylinder, and means located above the plate and adapted to be operated by the rotation of the shaft for operating an indicator whereby the quantity of liquid in the container can be ascertained.

3. A quantity indicating device for liquid containers comprising a container having an opening in its top and a flange surrounding said opening, a plate supported on and secured to said flange, a support carried by said plate and extending into said container to a point adjacent its bottom, an arm pivotally mounted in said frame intermediate the ends thereof, a float adjustably secured to said arm, a shaft rotatably mounted in said frame and extending through said plate, gears carried by said shaft and arm whereby said shaft is rotated when said arm is moved by said float, an indicator, a housing carried by the plate, a potentiometer mounted in said housing, a contact arm carried by said shaft and insulated therefrom, said contact arm adapted to contact with said potentiometer, means carried by the lower end of the frame and pivotally connected to said arm and normally immersed in the liquid in the container and co-operating therewith for preventing violent movements of the float when the liquid in the container is agitated, electric conductors for connecting said potentiometer to a source of electrical energy, and electric conductors for connecting said potentiometer and said contact arm to said indicator.

In testimony whereof, we have signed our names to this specification.

ALPHONS DITTLINGER.
NICHOLAS DITTLINGER.
EMIL V. DITTLINGER, Jr.